United States Patent Office 3,714,957
Patented Feb. 6, 1973

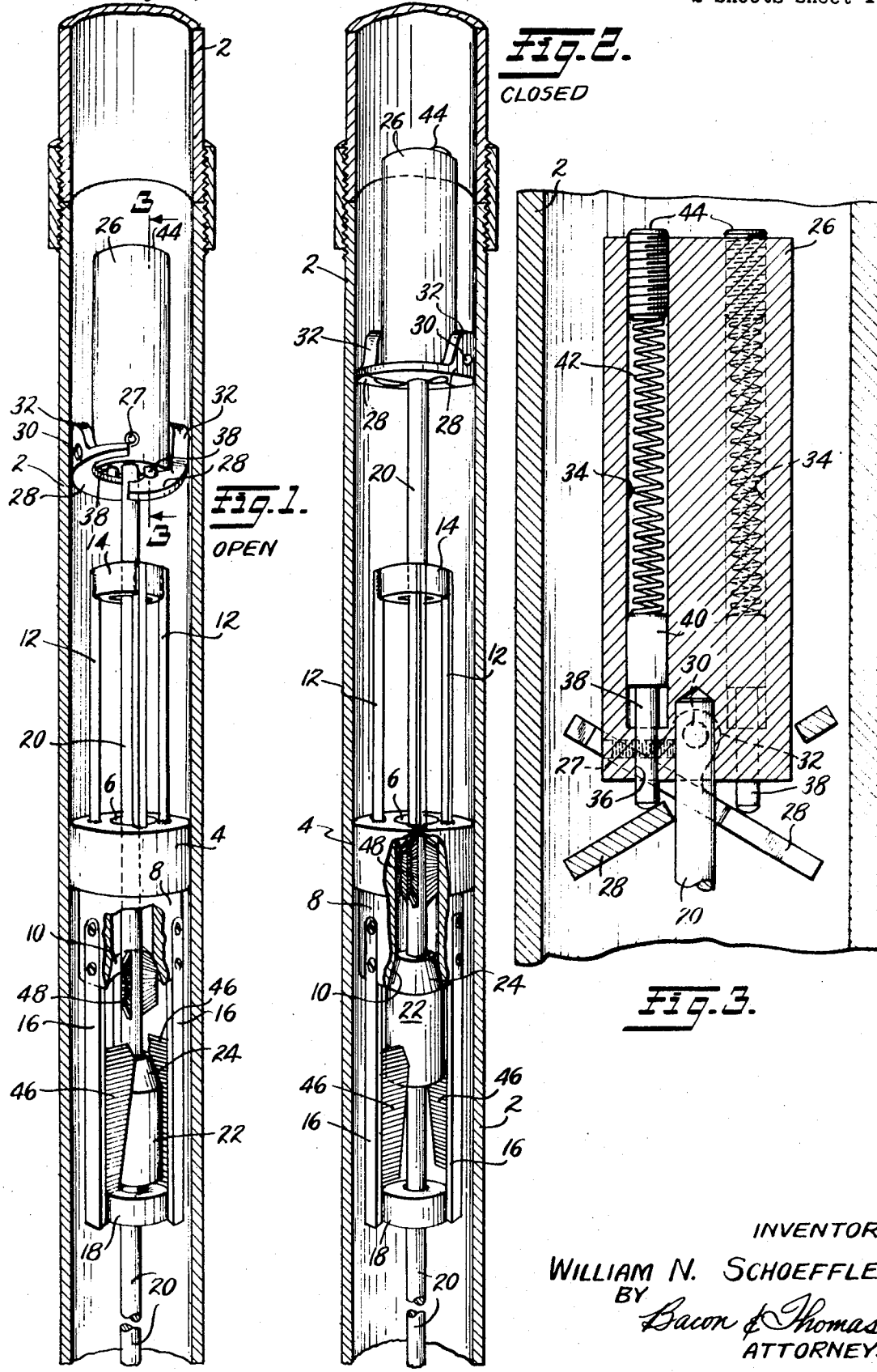

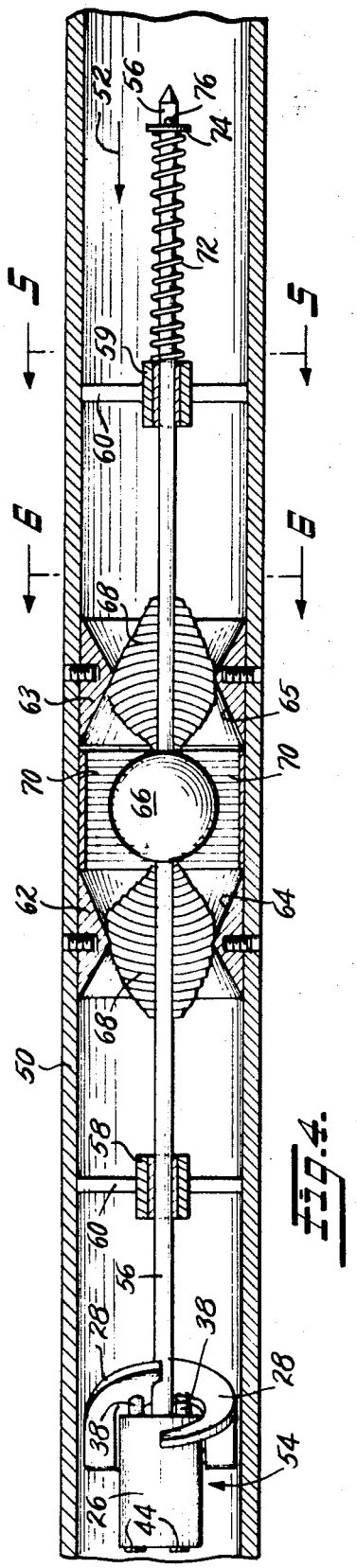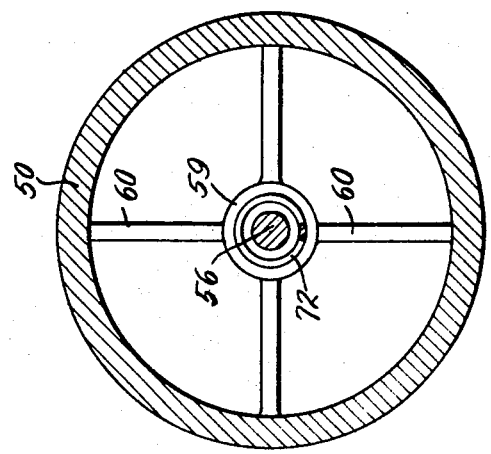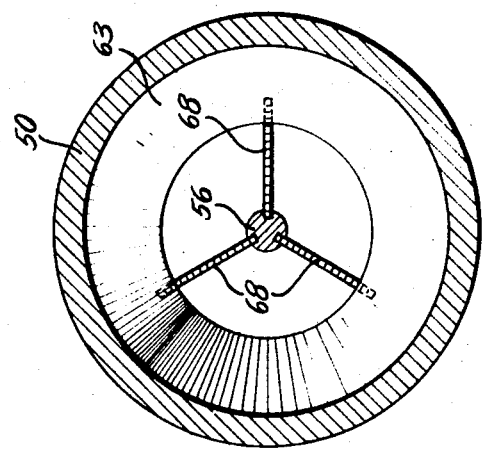

3,714,957
SELF-CLEANING STORM CHOKE
William N. Schoeffler, Rte. 1, P.O. Box 389,
Carencro, La.
Filed July 21, 1971, Ser. No. 164,654
Int. Cl. F16k 17/28, 29/00
U.S. Cl. 137—244                                    10 Claims

ABSTRACT OF THE DISCLOSURE

A conduit has a valve with a valve seat fixed in the conduit and a valve member movable longitudinally to open or close the valve. Vanes fixed relative to the valve member cause the assembly to rotate during fluid flow in the conduit to cause cleaning means to constantly wipe the valve seat and valve member clean of any foreign matter in the fluid. The vanes respond to pressure or velocity surges to assume positions substantially closing the conduit and to then act like a piston to pull the valve closed.

BACKGROUND OF THE INVENTION

This invention is in the field of storm chokes for closing oil well production lines or pipe lines in the event of a break or sudden increase in pressure.

In production lines from oil wells or in pipe lines conducting materials from one location to another, a break in the conduit obviously results in loss of considerable fluid and in many instances it is difficult or impossible to cut off flow and serious damage and loss result. A particularly dangerous situation exists in off-shore oil production wherein high seas or other marine events often rupture a production line, thus causing spillage of oil in the surrounding waters and such spillage not only contaminates the water but presents an extremely serious fire hazard. In the event of such an occurrence, it has been heretofore extremely difficult to stem flow from the well.

SUMMARY OF THE INVENTION

The present invention provides an extremely simple automatic valve that can be placed in a production line or pipe line and comprises a valve therein having a movable valve member that is biased to a normally open position and the movable valve member is fixed relative to inclined vanes that cause the valve member to rotate during fluid flow in the production line or pipe line. The bias on the valve is sufficient to hold it open during normal production flow and the vanes referred to cause the valve member to rotate relative to its valve seat. Cleaning means, respectively fixed relative to the valve member and to the valve seat, are positioned to constantly wipe the valve seat and a seating surface on the valve member so that foreign material, such as sand or the like, in the production fluid cannot contaminate the valve surfaces and prevent proper or complete closing thereof. The vanes referred to are pivotally mounted relative to the valve member and are biased to a normally inclined position to cause the described rotation but in the event of a surge of pressure, which necessarily results in increased velocity of flow, the vanes pivot to a position substantially closing the conduit whereby pressure thereon functions as it would on a piston to forceably pull the vanes and the movable valve member into seating engagement with the valve seat and, thus, automatically close the pipe against further or continued flow therethrough.

The invention disclosed herein contemplates forms for employment in vertical production lines or in horizontal pipe lines.

BRIEF DESCRIPTION OF THE DRAWINGS

FIG. 1 is a partial vertical sectional view through a vertical production line showing the present invention with the valve in open position;

FIG. 2 is a view similar to FIG. 1 but showing the valve in its closed position;

FIG. 3 is an enlarged fragmentary sectional view taken substantially on the line 3—3 of FIG. 1;

FIG. 4 is a vertical sectional view taken through a further embodiment of the invention adapted for use in a horizontal pipe line; and FIGS. 5 and 6 are, respectively, transverse sectional views taken on the lines 5—5 and 6—6 of FIG. 4.

DESCRIPTION OF THE PREFERRED EMBODIMENTS

Referring first to FIGS. 1, 2 and 3, numeral 2 indicates a generally vertically extending production line, which may be a well casing or a separate pipe therein. The structure of this embodiment of the invention will preferably be placed in the production line or well casing close to or possibly somewhat below ground level even though the production line may be in an off-shore installation. However, the invention may be employed at any desired location in the production line.

As shown, a plug member 4 is tightly fitted in the conduit 2 and is provided with an opening 6 therethrough, through which production fluid may flow. A downwardly extending sleeve portion 8 of reduced diameter defines an annular valve seat 10 surrounding the opening 6. A plurality of struts 12 are fixed to and extend upwardly from the plug member 4 and at their upper ends the struts 12 support a bushing or bearing 14. Likewise, a plurality of struts 16 are fixed to and extend downwardly from the portion 8 of plug 4 and at their lower ends the struts 16 support a further bushing or bearing 18. A reciprocable shaft 20 extends through and is journalled in bushings 14 and 18 whereby it is rotatable therein and axially movable therethrough. As shown, the shaft 20 extends axially through the opening 6 and is of a length considerably greater than the distance between the bushings 14 and 18. A movable valve member 22 is fixed to the shaft 20 and movable therewith to engage its seating surface 24 on the valve seat 10 when the valve is closed.

A solid head member 26 is fixed to the upper end of the shaft 20, such as by set screw 27, and is shown in greater detail in FIG. 3. A pair of generally semi-circular vanes 28 are pivotally mounted on the head 26 by means of the pivot pin 30, which extends through the head 26 and through upwardly extending ears 32 on the vanes 28. The head 26 is provided with a pair of diametrically spaced bores 34 terminating at their lower ends in smaller openings 36 through which shanks 38 of slidable thrust plugs 40 slidably extend. The shanks 38 are positioned to bear at their lower ends on the upper surfaces of their respective vanes 28, each at a position laterally displaced from the pivot pin 30. Within each bore 34 is a compression spring 42 bearing at its lower end on the thrust plug 40 and held under compression by an adjustable threaded plug 44 threaded into the upper end of the bore 34. Thus, plugs 44 may be preset or adjusted to provide the desired value of compression force stored in springs 42 and thus predetermine the torque applied to the vanes 28, which normally holds the said vanes in the tilted or oblique positions shown in FIGS. 1 and 3. As is further apparent from FIG. 3, the downwardly facing area of each vane 28 is considerably greater on one side of the pivot pin 30 than the area of that vane on the other side of the pivot pin. Thus, any upward fluid pressure applied to the lower surfaces of the vanes will apply a net torque thereto in a direction tending to rotate each vane about the pivot pin 30 in opposition to the torque provided by the springs 42.

As also shown in the figures, the struts 16 are provided with flexible wipers 46 fixed thereto and configured and positioned to wipingly engage the outer surfaces of valve member 22 and particularly its seating surface 24. Likewise, the shaft 20 is provided with similar resilient wiping means 48 fixed thereto and positioned and configured to engage and wipe the annular valve seat 10, all when the parts are in the positions shown in FIG. 1. The wiping means 46 and 48 may, for example, be in the form of flexible vanes of rubber or rubber-like materials similar to those shown in FIG. 6.

It will be obvious that when the parts are in the relative positions shown in FIG. 1, and production fluid is flowing upwardly in the conduit 2, that flow of fluid past the tilted vanes 28 will cause the shaft 20 to rotate. As the shaft rotates, the wipers 48 constantly wipe valve seat 10 and keep it clean of any possible accumulation of foreign material. Likewise, the wiper vanes 46 fixed to the struts 16 constantly wipe the movable valve member 22 and particularly its seating surface 24 so that the seating surface and valve seat are always in condition to be firmly and securely seated to provide a perfect closure against fluid flow when the occasion arises.

In the event that the production line 2 may rupture or break at a location above the described structure, or in the event of a sudden surge of high pressure in the production fluid (which could be potentially dangerous to surface installations), the sudden increase in fluid pressure against the vanes 28, in an upward direction, causes those vanes to move from the tilted position shown in FIG. 3 to the generally horizontal position shown in FIG. 2, even against the force of spring 42. As is obvious from FIG. 2, when the vanes have been so positioned by the described force, they substantially close the interior of conduit 2 and this actually increases the differential pressure on the two sides of the vanes to hold them in such position. Under the described conditions, the pressure exerted upwardly on the "closed" vanes 28 is sufficient to lift the movable valve structure to the position of FIG. 2 wherein clean seating surface 24 is firmly seated against clean valve seat 10 and flow of fluid is thereby stopped. Obviously, the pressure of the fluid acting upwardly on the valve member 22 will then hold the same closed.

The shaft 20, movable valve member 22, head member 26 and vanes 28, are of sufficient mass and weight so that gravity will bias the valve to the open position of FIG. 1. and hold it open against all normal production flow.

Referring now to FIGS. 4-6, numeral 50 indicates a horizontally extending pipe through which fluid material is caused to flow under pressure from right to left, as seen in FIG. 4, and indicated by the arrow 52. In this form of the invention, structure corresponding to that shown in FIG. 3 is indicated generally at 54 wherein the same parts are identified by the same reference numerals occurring in FIG. 3. The head 26 is fixed to the left end of a shaft 56 which is journalled and slidable in bushings 58 and 59 carried by suitable spiders 60 fixed in the pipe 50. A pair of valve rings 62 and 63 are fixedly mounted in the pipe 50 in axially spaced relation between the bushings 58 and 59. Each valve ring 62 and 63 is provided with an annular valve seat 64–65, either of which may be engaged by a generally spherical valve member 66 fixedly mounted on the shaft 56.

The shaft 56 is provided with flexible wipers fixed thereon in position to engage and wipe annular valve seats 64 and 65. Also, stationary wiper means 70 are fixed to the inner surface of pipe 50 between valve rings 62 and 63 and in position to engage and wipe the valve member 66, and particularly those axially opposed surface portions thereof constituting seating surfaces engageable with the valve seats 64 and 65.

A compression spring 72 surrounds the shaft 66 and extends therealong upstream from the bushing 59. One end of the spring 72 bears against the bushing 59 and its other end bears against a washer or ring 74, which in turn is held in position by transverse pin 76 through shaft 56.

Since the modification shown in FIG. 4 is intended for use in a horizontally extending conduit, gravity cannot be employed to normally hold the choke valve in its open position. Spring 72, however, will obviously hold the valve member 66 in the illustrated open position generally midway between valve seats 64 when fluid is flowing. In the position shown in FIG. 4, the spring 72 is slightly compressed.

When fluid flows through the conduit of pipe 50 in the direction of the arrow some fluid drag between the flowing material and the movable parts of the choke valve will tend to move valve member 66 to the left but spring 72 resists any substantial movement due to such normal dragging. However, in the event of a break or rupture in the pipe 50 in any region thereof to the left of the portion shown in FIG. 4, automatic closing of the choke valve takes place in exactly the same manner as described with reference to FIGS. 1–3, by moving the valve member 66 to the left to engage and seal against the valve member 62 on the left side of member 66.

In horizontal installations of the type shown in FIG. 4, the automatic choke valve described is preferably duplicated at spaced positions along a pipe line. Thus, when a break occurs between any two such choke valves, the one on the upstream side of the break will function in the manner already described to close the pipe and thus prevent any further fluid flowing past that valve. On the downstream side of the break there will be a sudden loss of pressure and flow past the next choke valve and there will be a tendency for fluid therein to flow rearwardly to the break. Under these conditions the downstream choke valve will be closed automatically by the energy stored in spring 72 and rearward flow of fluid and thus prevent undue reverse flow of that fluid and loss thereof through the break.

While a limited number of specific embodiments have been shown and described, the same are merely illustrative of the principles involved and other forms will be obvious to those skilled in the art, within the scope of the appended claims.

What is claimed is:
1. In a self-cleaning storm choke:
   a fluid flow conduit;
   a fixed annular seat in said conduit;
   a valve member, having a seating surface, mounted in said conduit for axial movement toward and from said valve seat and for rotation about an axis longitudinally of said conduit;
   vane means axially movable and rotatable with said valve member, said vane means normally extending oblique to said axis thereby being responsive to fluid flow therepast to rotate said valve member;
   cleaning means responsive to relative rotation between said valve seat and said valve member for wiping said valve seat and said seating surface free of foreign matter; and
   means responsive to high flow velocity in said conduit to move said vanes to substantially obstruct said conduit and thereby move said seating surface axially to said valve seat and close said conduit against further fluid flow.

2. A storm choke as defined in claim 1 wherein said valve member and vane means are mounted on a common shaft extending axially through said valve seat, on longitudinally opposite sides thereof, said cleaning means comprising flexible wipers mounted on said shaft and in fixed position on said conduit and respectively opposite said valve seat and said seating surface when said valve member is in its open position.

3. A storm choke as defined in claim 2 wherein said shaft is journalled in bearing means fixed in said conduit on longitudinally opposite sides of said valve seat.

4. A storm choke as defined in claim 1 wherein said vane means and valve member are mounted on a common shaft extending axially through said valve seat, said vane means comprising at least two vanes pivotally mounted on said shaft about axes transverse thereto, yieldable means urging said vanes to a position about their axes wherein they are normally in said position oblique to said axis, said yieldable means being yieldable in response to a predetermined pressure on said vanes, caused by high flow velocity.

5. A storm choke as defined in claim 4 wherein the surface areas of said vanes, on opposite sides of their respective axes, are unequal.

6. A storm choke as defined in claim 4 wherein said yieldable means comprise springs, and means for selectively adjusting the force exerted by said springs on said vanes.

7. A storm choke as defined in claim 6 wherein said vanes are pivoted to one end of a head member fixed on said shaft and having longitudinally extending bores therein, said springs being compression springs in said bores and being positioned laterally of the respective pivot axes of said vanes, thrust means between each spring and its respective vane, and means for selectively adjusting the length and thereby the force of each spring.

8. A storm choke as defined in claim 1 wherein said conduit extends generally vertically and said valve member is positioned below said valve seat whereby gravity urges said valve member away from said seat, toward its open position.

9. A storm choke as defined in claim 1 wherein said conduit extends generally horizontally, and spring means urging said valve member away from said valve seat, toward its open position.

10. A storm choke as defined in claim 9 wherein said valve member is provided with a second seating surface axially opposite said first-named seating surface, and a second annular valve seat in said conduit, engageable by said second seating surface when said first named seating surface moves a predetermined distance away from said first-named valve seat.

References Cited

UNITED STATES PATENTS

| | | | |
|---|---|---|---|
| 2,401,129 | 5/1946 | Arnold | 137—244 |
| 2,415,674 | 2/1947 | Hoffman | 137—499 X |
| 2,447,827 | 8/1948 | Turecheck | 137—499 X |

ALAN COHAN, Primary Examiner

R. GERARD, Assistant Examiner

U.S. Cl. X.R.
137—332, 499, 504